United States Patent [19]
Holoubek et al.

[11] Patent Number: 5,322,658
[45] Date of Patent: Jun. 21, 1994

[54] METHOD OF MAKING THERMOPLASTIC COMPOSITE LAYERED SQUEEZE TUBE

[75] Inventors: George H. Holoubek; John J. Rhoades, both of Muscatine, Iowa

[73] Assignee: Courtaulds Packaging Inc., Florence, Ky.

[21] Appl. No.: 19,145

[22] Filed: Feb. 17, 1993

Related U.S. Application Data

[62] Division of Ser. No. 928,250, Aug. 10, 1992, Pat. No. 5,238,148.

[51] Int. Cl.⁵ .............................................. B29C 57/00
[52] U.S. Cl. .................................... 264/150; 264/173; 264/245; 264/296; 264/DIG. 41; 425/131.1
[58] Field of Search ............. 264/173, 150, 512, 533, 264/DIG. 41, 245, 296; 425/462, 131.1, 133.1

[56] References Cited

U.S. PATENT DOCUMENTS

| | | | |
|---|---|---|---|
| 2,141,776 | 12/1938 | Vautier et al. | 425/131.1 |
| 2,227,682 | 1/1941 | Wade | 264/173 |
| 2,484,965 | 10/1949 | Slaughter | 264/150 |
| 2,599,493 | 6/1952 | Slaughter | 264/173 |
| 3,047,910 | 8/1962 | Downs | 264/296 |
| 4,182,601 | 1/1980 | Hill | 425/133.1 |
| 4,248,824 | 2/1981 | Hattop | 425/133.1 |
| 4,723,902 | 2/1988 | Erickson | 425/462 |
| 4,802,833 | 2/1989 | Shapler | 264/173 |
| 4,888,188 | 12/1989 | Castner, Sr. et al. | 426/110 |
| 5,069,856 | 12/1991 | Holoubek et al. | 264/519 |

FOREIGN PATENT DOCUMENTS

| | | | |
|---|---|---|---|
| 57-25924 | 2/1982 | Japan | 264/173 |
| 1392291 | 4/1975 | United Kingdom | 264/173 |

*Primary Examiner*—Jeffery Thurlow
*Attorney, Agent, or Firm*—Armstrong, Westerman, Hattori, McLeland & Naughton

[57] ABSTRACT

A thermoplastic tube, and method for forming such a tube, has a tube body portion formed from an inner layer of thermoplastic material, a barrier layer, and an outer layer of thermoplastic material. The outer layer does not extend completely about the periphery of the tube body and a strip of thermoplastic material having the same composition as the inner layer, fills each gap in the outer layer to form a smooth surface about the tube. The strip may be transparent or of a color different than the color of the outer layer. In a preferred tube, a first layer of adhesive material is provided between the inner layer and the barrier layer, and a second layer of adhesive material is provided between the barrier layer and the outer layer and strip.

11 Claims, 2 Drawing Sheets

METHOD OF MAKING THERMOPLASTIC COMPOSITE LAYERED SQUEEZE TUBE

This is a division of application Ser. No. 07/928,250 filed Aug. 10, 1992 now U.S. Pat. No. 5,238,148 issued Aug. 24, 1993.

FIELD OF THE INVENTION

The present invention relates to a thermoplastic tube formed from an extruded multi-layer tubular cylinder, which tube has at least one strip along the tube, in the axial direction of the tube, which is of a different transparency or color than the remainder of the tube.

BACKGROUND OF THE INVENTION

Thermoplastic tubes in the form of squeeze tubes have been commercially available for use in the packaging of toothpaste, shampoo, cosmetics, foodstuffs, and the like. Such tubes may be produced by severing a tube blank from an extruded tubular cylinder, which tube blank has open ends, and forming a head on one end of the tube blank which has a threaded neck or other means for releasably securing a cap on that end of the tube. After filling the capped tube from the other open end, that other open end is then sealed, such as by heat sealing, to protect the tube contents and to complete the filled tube for subsequent sale.

The formation of such thermoplastic squeeze tubes from multi-layered material, or extruded composites, has been found useful in that a barrier layer may be provided, such as an oxygen impermeable layer, which barrier layer prevents escape of essential oils, or the like, from the tube contents, and protects the contents of the tube from discoloration, change in taste, or other detrimental affect of oxygen on the tube contents. The formation of extruded composite tubular cylinders for use in forming tube blanks is a known procedure, as for example described in U.S. Pat. No. 4,723,902, entitled Balanced Flow Extrusion Crosshead and Die Assembly, assigned to the assignee of the present invention, the contents of said patent incorporated by reference herein. As described, such tubes generally have five layers which comprise innermost and outermost layers of a thermoplastic material, a central layer of a barrier polymeric material, and adhesive polymeric material layers, one between the innermost thermoplastic layer and the barrier layer and the other between the outermost thermoplastic layer and the barrier layer. In some instances, where the inner and outer layers adhere sufficiently themselves to the barrier layer, the separate adhesive layers may not be necessary, and a three layered extruded composite tube may be provided.

Such thermoplastic multi-layered tubes have been readily accepted and have been provided with various decorative features and indicia. Indicia, decorative features, and printed matter may be applied to thermoplastic tubes by hot stamping or dry printing, or application of a foil pattern to the tube outer surface. When the thermoplastic multi-layered tube is formed from transparent or translucent material, the tube contents of the tube are visible to the user, but readability of the printed matter on the tube may be less than desired due to the clear background. Or, when the tube has a colored component as one of the layered materials of the multi-layered tube, the readability of the printed matter can be enhanced, but the tube contents are no longer visible to show the amount of contents remaining after partial use by a purchaser. Also, the added step of providing decorative features increases the cost of the tube.

It is an object of the present invention to provide a thermoplastic composite layered tube that has at least one strip of material along the length of the tube that is either transparent, while the remainder of the tube is non-transparent, or is of a color different from the color of the remainder of the tube.

It is another object of the present invention to provide a method of forming a thermoplastic composite layered tube that has at least one strip along the length of the tube that is either transparent, while the remainder of the tube is non-transparent, or is of a different color from the color of the remainder of the tube, during the tube manufacturing process, without the subsequent need to apply ink or foil along the length of the tube.

SUMMARY OF THE INVENTION

The thermoplastic composite layered tube of the present invention has a tube body portion formed as a multi-layered hollow cylindrical body having a longitudinal axis. The tube body portion has an inner layer of thermoplastic material, such as polyethylene, a barrier layer, such as an ethylene polyvinyl alcohol polymer, and, superimposed partially over the barrier layer, an outer layer of a thermoplastic material, such as polyethylene, in a manner that provides at least one gap in the outer layer in a direction parallel to the longitudinal axis of the tube body portion, and a strip of thermoplastic material, of a material the same as the material of the inner layer is provided filling each gap. A head is formed on one end of the tube body portion, the head having an orifice for squeezing contents of the tube therefrom, and a cap is releasably secured to the head to close the orifice. Upon filling the tube with contents, the end of the tube body portion opposite the head is sealed, such as by heat sealing.

In one embodiment of the present tube, the inner layer of thermoplastic material, the barrier layer, and the strip of thermoplastic material are transparent, while the outer layer of thermoplastic material is non-transparent thus providing a strip of transparency along the tube body portion. In such an embodiment, the outer layer of thermoplastic material may be either opaque or colored.

In another embodiment of the present tube, at least one of the inner layer, the barrier layer, or strip of thermoplastic material are of a first color, while the outer layer of thermoplastic material is of a different color. In such an embodiment, a strip of material of a color different from the color of the remainder of the tube is thus provided.

In a preferred embodiment of the present tube, a five layered, multi-layered tube body portion is provided, with a first adhesive layer provided between the inner layer and the barrier layer, and a second adhesive layer provided between the barrier layer and the outer layer and strip of thermoplastic material of a material the same as the material of the inner layer.

The method according to the present invention involves extruding a specific multi-layered cylinder having a longitudinal axis, severing a tube blank from the extruded cylinder, forming a head on one end of the tube blank having an orifice therethrough, and releasably securing a cap on the head. The multi-layered cylinder formed on extrusion has an inner layer of thermoplastic material, a barrier layer on the inner layer, and an outer layer of thermoplastic material superimposed over a portion of the barrier layer, and at least one strip of thermoplastic material the same as the inner layer so as to provide a strip parallel to the longitudinal axis of the multi-layered cylinder. Preferably, the cylinder formed on extrusion has a first adhesive layer between the inner layer and the barrier layer, and a second adhesive layer between the barrier layer and the outer layer of thermoplastic material, and the strip of thermoplastic material the same composition as the inner layer.

BRIEF DESCRIPTION OF THE DRAWINGS

The present invention will now be explained with reference to the accompanying drawings wherein like numerals indicate like parts throughout the drawings, and wherein.

DETAILED DESCRIPTION

Figure 1:
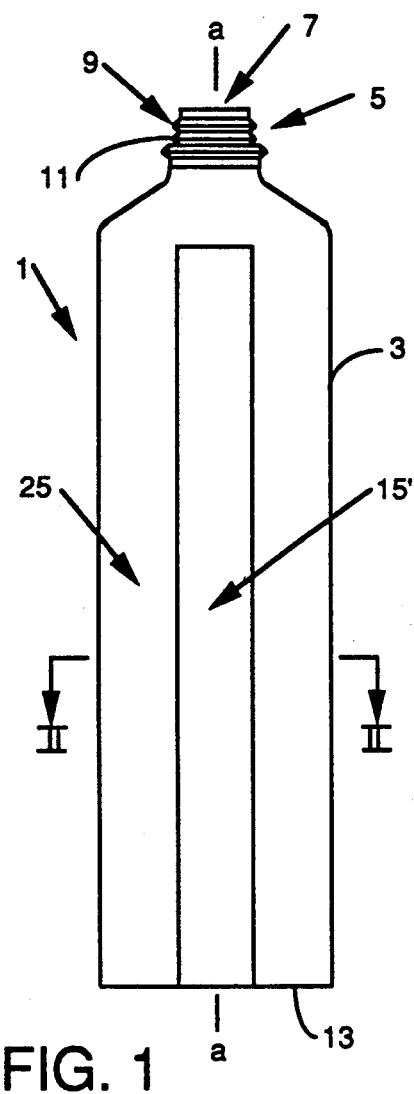
FIG. 1 is a front elevational view of a five layered tube of the present invention having a single strip.
Figure 2:
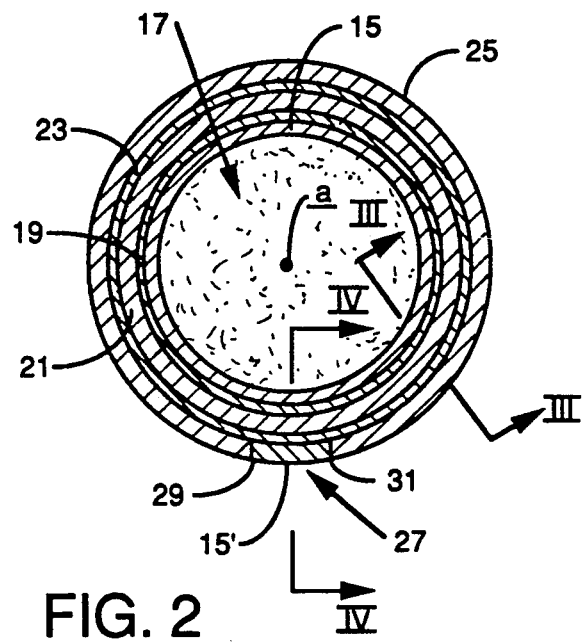
FIG. 2 is a cross-sectional view taken along lines II—II of FIG. 1.
Figure 3:
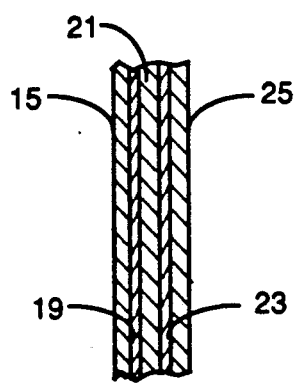
FIG. 3 is a view taken along lines III—III of FIG. 2.
Figure 4:
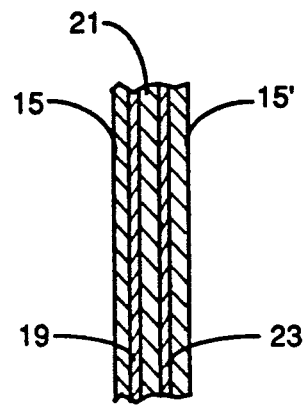
FIG. 4 is a view taken along lines IV—IV of FIG. 2.

The thermoplastic composite layered tube of the present invention is formed from a tube blank cut from an extruded multi-layered cylinder. Referring now to the drawings, which illustrate a single strip along a tube, although it is understood that a plurality of such strips may be provided, a thermoplastic composite layered tube 1, having five layers, is illustrated in FIGS. 1-4 prior to filling of the tube with the desired contents and sealing of the end of the tube opposite the end to which a head has been secured. A head 5 is secured to one end of the tube body portion 3, the head 5 having an orifice 7 formed therethrough and means 9 thereon for releasably securing a cap thereto, such as threads 11. The other end 13 of the tube body portion 3 is open, until the contents of the tube are changed thereto and the open end 13 is then sealed such as by heat sealing.

The tube body portion 3 is formed as a multi-layered hollow cylinder having a longitudinal axis a. The five layered tube body portion 3, has an inner layer of thermoplastic material 15 that is adapted to contact the tube contents 17 after the thermoplastic composite layered tube 1 has been filled. Superimposed over and adhered to the inner layer of thermoplastic material 15 is a first adhesive layer 19 which completely surrounds the inner layer 15. Superimposed over and adhered to the first adhesive layer 19 is a barrier layer 21, such as an oxygen-impermeable thermoplastic polymer, which barrier layer completely surrounds the first adhesive layer 19. On the side of the barrier layer 21 opposite the first adhesive layer, there is superimposed and adhered a second adhesive layer 23, which second adhesive layer 23 completely surrounds the barrier layer 21. Finally, an outer layer 25 of thermoplastic material is superimposed over and adhered to the second adhesive layer 23, which outer layer 25, however, is superimposed over only a portion of the second adhesive layer 23. As shown, a gap 27 is provided between opposite ends 29 and 31 of the outer layer 25 of thermoplastic material, and a strip of thermoplastic material 15', of the same composition as the inner layer of thermoplastic material 15, which has been extruded along with the outer layer 25, is adhered to the second adhesive layer 23 and welded to the ends 29, 31 of the outer layer of thermoplastic material 25. The outer layer 25 of thermoplastic material and the strip of thermoplastic material 15' combine to form a substantially smooth outer surface along the tube body portion 3.

The inner layer 15 of thermoplastic material may be composed, for example, of high density polyethylene, low density polyethylene, polypropylene, or a polyester such as polyethylene terephthalate. The barrier layer 21 may comprise various low-gas permeable polymeric materials, for example oxygen-impermeable polymeric materials such as polyamides, such as nylon, ethylene polyvinyl alcohol polymers, or a polyvinylidene chloride and copolymers containing a major portion of polyvinylidene chloride. The first and second adhesive layers 19 and 23 are known polymeric compositions that adhere various thermoplastic layers to barrier layers, such as ethylene vinyl acetate copolymers, ethylene ethyl acrylate copolymers, and the like.

The strip of thermoplastic material 15', shown as a single strip, although a plurality of each strip may be provided, which overlays the second adhesive layer 23 is of the same composition as the inner layer 15 of thermoplastic material, while the outer layer 25 of thermoplastic material may comprise the same polymeric material but will be a composition that is different from the strip of thermoplastic material 15'. For example, the inner layer 15 and strip 15' may comprise a clear polyethylene material, while the outer layer 25 would comprise a polyethylene material containing a colorant. Or, the inner layer 15 and strip 15' may comprise a clear polyethylene material, while the outer layer 25 would comprise a blend of high density and low density polyethylenes which form an outer opaque layer. In addition, one colorant could be added to either the inner layer 15 and strip 15' or the barrier layer, while the outer layer 25 could contain a distinct colorant, so as to produce a colored stripe down the length of the tube different from the remainder of the tube body.

The thicknesses of the various layers and the overall thickness of the wall of the composite layered tube will vary dependent upon the size of the tube and the end use to which the tube is to be put. Typically, the inner layer would be between 0.004–0.007 inch think, preferably about 0.005 inch; the barrier layer would be between 0.0005–0.002 inch thick, preferably about 0,001 inch; the first and second adhesive layers would each be between 0.0002–0.001 inch thick, preferably about 0.0005 inch; and the outer layer and strip of thermoplastic material would be between 0.008–0.012 inch thick, preferably about 0.010 inch.

Figure 5:
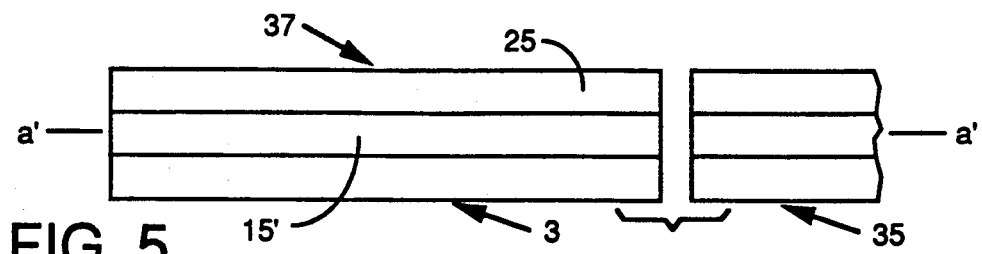
FIG. 5 is a plan view of an extruded multi-layered cylinder with a tube blank severed therefrom.
Figure 6:
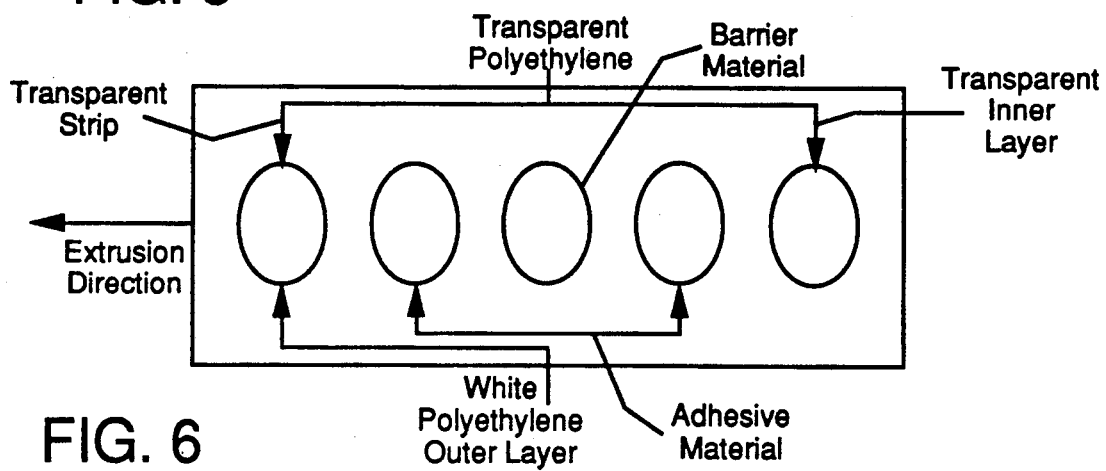
FIG. 6 is a schematic illustration of an extruder crosshead with the sequential feeding of materials to form a five layered extruded multi-layered cylinder from which tube blanks are cut.

According to the method of forming the thermoplastic composite layered tube of the present invention, a multi-layered cylinder 35 (FIG. 5) is extruded, the cylinder having a longitudinal axis a'. The multi-layered cylinder is extruded as an inner layer of thermoplastic material, a first adhesive layer completely surrounding the inner layer, a barrier layer completely surrounding the first adhesive layer, and a second adhesive layer completely surrounding the barrier layer. At the same time as extrusion of the inner layer, two adhesive layers and the barrier layer, an outer layer of thermoplastic material is extruded over the second adhesive layer, which outer layer covers only a portion of the second adhesive layer, and a gap left between opposed ends of the outer layer is filled with an extruded strip of thermoplastic material that has the same composition as the thermoplastic composition of the inner layer, to form a smooth outer surface on the extruded cylinder. As aforementioned, a plurality of such gaps may be provided, each filled with an extruded strip of the thermoplastic material of the same composition as the inner layer. After extrusion of the multi-layered cylinder 35, a tube blank 37, which is used as a tube body portion 3, is severed from therefrom. The extrusion sequence is schematically illustrated in FIG. 6 for producing a five layered polyethylene tube having a white polyethylene outer layer and a clear polyethylene strip along the length of the tube. As illustrated schematically in an extrusion crosshead assembly, a transparent polyethylene material is charged to form the inner layer of the cylinder as well as the transparent strip overlying the second adhesive material. A clear barrier material and clear adhesive materials are also used. The outer layer comprises a white polyethylene material which overlies the second adhesive layer, except for the area covered by the thermoplastic strip so as to produce a tube having a white body portion with a transparent strip along the length thereof.

After severing, the tube blank, which forms a body portion 3, has a head 5 formed thereon, which closes one end of the tube blank. The head generally has threads or other means thereon for releasable securement of the cap, and an orifice is provided through the head to exude contents of a filled tube by a user. The head may be formed by known means, such as, for example, the methods described in U.S. Pat. No. 3,047,910 to Downs, or U.S. Pat. No. 5,069,856 to Holoubek and Rhoades, the contents of said two patents incorporated by reference herein.

In some tubes, the tube body portion 3 may be formed as a multi-layered hollow cylinder having three layers, with the adhesive layers not required. In such tubes, an inner layer of thermoplastic material 15 would be provided, with a barrier layer 21 superimposed over the inner layer 15, and an outer layer of thermoplastic material 25 superimposed over only a portion of the barrier layer 21 so as to provide at least one gap 27 in the outer layer parallel to the longitudinal axis, and a strip of thermoplastic material 15', of the same composition as the inner layer 15 filling each gap 27 to provide a substantially smooth outer surface for the tube body portion.

Figure 7:
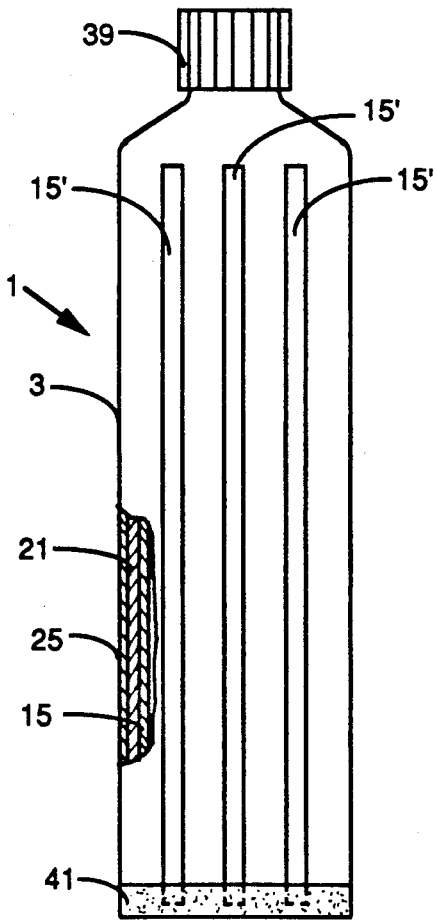
FIG. 7 is a front elevational view of a three layered tube of the present invention, having a plurality of strips, after filling the tube and sealing the end of the tube body opposite the head on the tube body, with a cut away section showing the layers.

A three layered tube having a plurality of strips 15', after formation of the head, placement of a cap 39, filling with contents, and sealing of the end 13 opposite the head 5 to form a seal 41, is illustrated in FIG. 7.

The present invention thus provides a thermoplastic composite layered squeeze tube with at least one integral strip along the length thereof that is formed during extrusion of the cylinder from which tube blanks are made, and which strip can be of a different transparency or different color than the remainder of the tube body.

What is claimed is:

1. The method of forming a thermoplastic composite layered tube comprising:

extruding a multi-layered cylinder with a longitudinal axis, by extruding an inner layer of thermoplastic material, extruding a superimposed barrier layer over said inner layer, and extruding a superimposed outer layer of thermoplastic material over only a portion of said barrier layer so as to provide at least one gap in said outer layer, between opposed ends thereof, parallel to said longitudinal axis, and extruding a strip of thermoplastic material, of the same composition as said inner layer, to fill each said gap to provide a substantially smooth outer surface for said cylinder and form a tube blank; and forming a head on said tube blank, said head having means thereon for releasable securement of a cap thereto.

2. The method of forming a thermoplastic composite layered tube as defined in claim 1, wherein said inner layer of thermoplastic material, said barrier layer, and said strip of thermoplastic material are substantially transparent and said outer layer of thermoplastic material is non-transparent.

3. The method of forming a thermoplastic composite layered tube as defined in claim 1, wherein at least one of said inner layer of thermoplastic material, said barrier layer, and said strip of thermoplastic material is of a first color and said outer layer of thermoplastic material is of a different color.

4. The method of forming a thermoplastic composite layered tube as defined in claim 1 wherein a first adhesive layer is extruded between said inner layer of thermoplastic material and said barrier layer, and a second adhesive layer is extruded between said barrier layer and said outer layer and said strip of thermoplastic material of the same composition as said inner layer.

5. The method of forming a thermoplastic composite layered tube as defined in claim 4, wherein said inner layer of thermoplastic material, said barrier layer, said first and second adhesive layers, and said strip of thermoplastic material are substantially transparent and said outer layer of thermoplastic material is non-transparent.

6. The method of forming a thermoplastic, composite layered tube as defined in claim 5, wherein said outer layer of thermoplastic material is opaque.

7. The method of forming a thermoplastic composite layered tube as defined in claim 5, wherein said outer layer of thermoplastic material is colored.

8. The method of forming a thermoplastic composite layered tube as defined in claim 4, wherein at least one of said inner layer of thermoplastic material, said barrier layer, said first and second adhesive layers and said strip of thermoplastic material is of a first color and said outer layer of thermoplastic material is of a different color.

9. The method of forming a thermoplastic composite layered tube as defined in claim 4 wherein said inner layer and strip of thermoplastic material comprise a clear polyethylene material and said outer layer of thermoplastic material comprises a white polyethylene material.

10. The method of forming a thermoplastic composite layered tube as defined in claim 1 wherein said inner layer of thermoplastic material and said strip of thermoplastic material are provided from a common supply of thermoplastic material.

11. The method of forming a thermoplastic composite layered tube as defined in claim 1 wherein a plurality of said gaps are provided in said outer layer, and a strip of said thermoplastic material, of the same composition as said inner layer fills each said gap.

* * * * *